(No Model.) 2 Sheets—Sheet 1.

G. G. CROWLEY.
DISK HARROW.

No. 489,146. Patented Jan. 3, 1893.

Witnesses:
Theo. L. Popp.
John N. Arduer.

George G. Crowley, Inventor.
By Wilhelm Bonner
Attorneys.

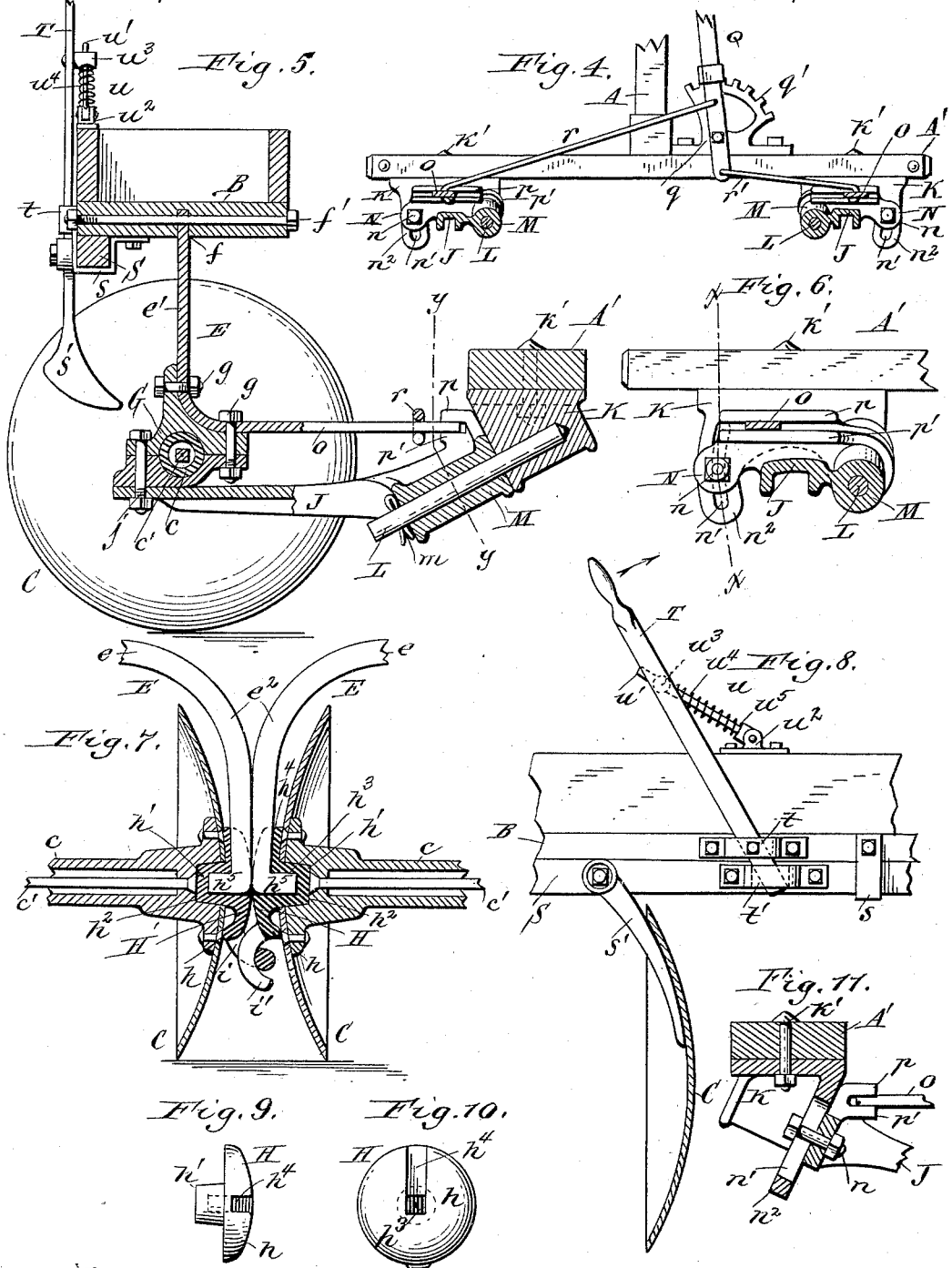

UNITED STATES PATENT OFFICE.

GEORGE G. CROWLEY, OF BATAVIA, NEW YORK, ASSIGNOR TO THE JOHNSTON HARVESTER COMPANY, OF SAME PLACE.

DISK HARROW.

SPECIFICATION forming part of Letters Patent No. 489,146, dated January 3, 1893.

Application filed October 27, 1891. Serial No. 409,972. (No model.)

*To all whom it may concern:*

Be it known that I, GEORGE G. CROWLEY, a citizen of the United States, residing at Batavia, in the county of Genesee and State of New York, have invented new and useful Improvements in Disk Harrows, of which the following is a specification.

This invention relates to that class of harrows which are provided with concavo-convex disks attached in gangs to planks, which latter are connected with the main frame by swiveling joints, so that the disk gangs can adjust themselves to the inequalities of the ground.

The objects of my invention are to provide a perfectly flexible harrow which will in all conditions of load and soil cut at an even depth at both ends of each gang; also to make the gangs reversible without employing extra parts, also to provide an improved mechanism for operating the scrapers.

Figure 1:
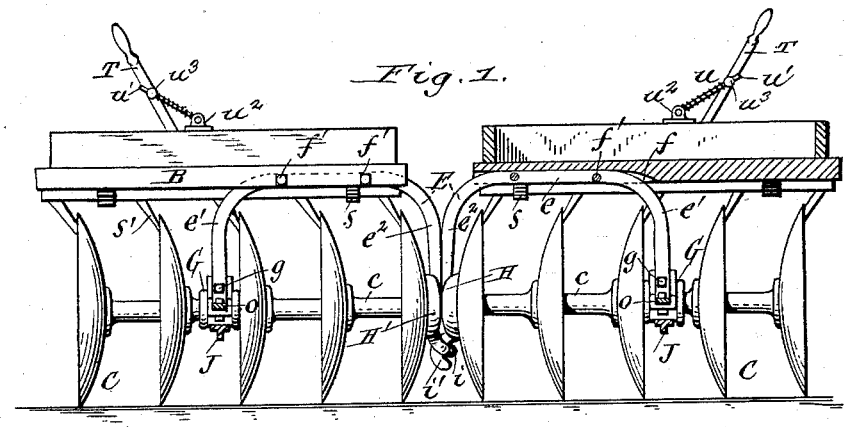
Figure 2:
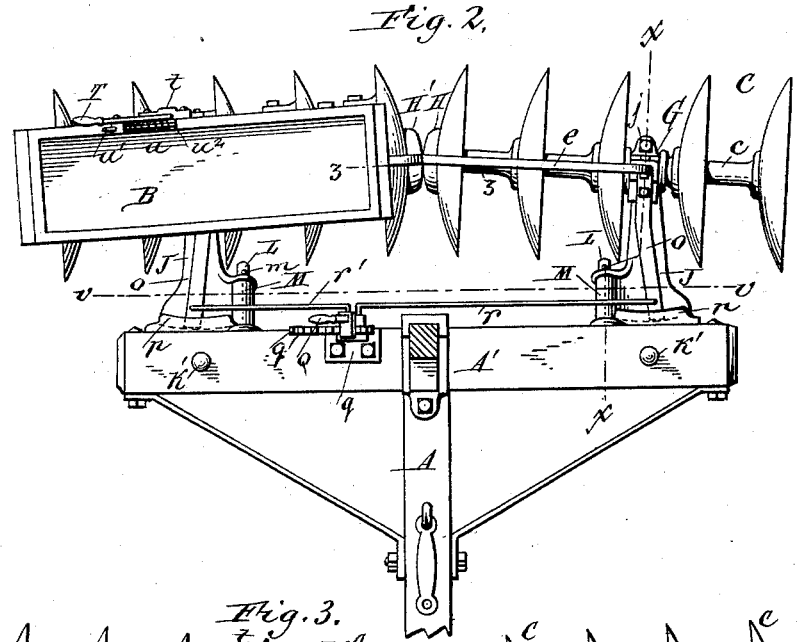
Figure 3:
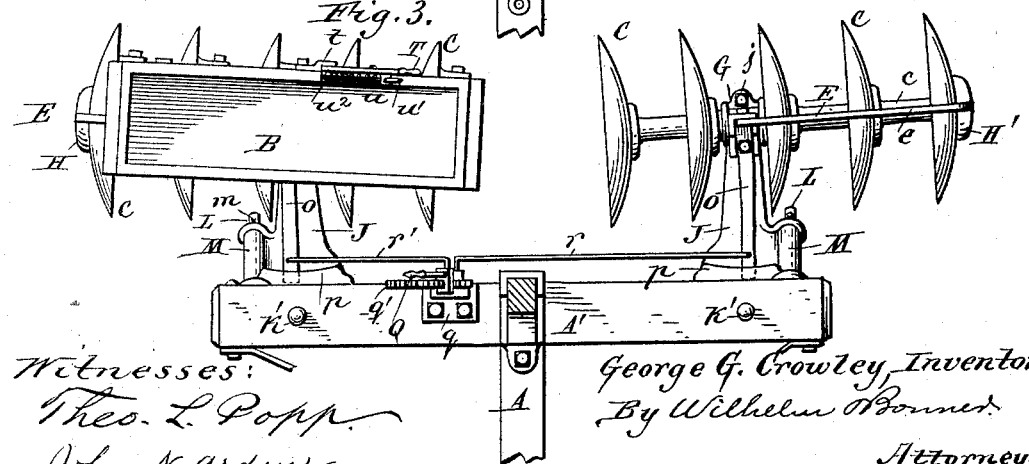

In the accompanying drawings consisting of two sheets:—Figure 1 is a front elevation of my improved harrow, partly in section, showing the gangs arranged with their concave sides outward. Fig. 2 is a top plan view thereof, with one of the gang planks removed. Fig. 3 is a plan view, showing the gangs reversed so as to stand with their concave sides inward. Fig. 4 is a vertical transverse section in line $v$—$v$, Fig. 2, looking forward. Fig. 5 is a vertical longitudinal section in line $x$—$x$, Fig. 2, on an enlarged scale. Fig. 6 is a vertical cross section in line $y$—$y$, Fig. 5. Fig. 7 is a fragmentary cross section, on an enlarged scale, of the adjoining ends of the disk gangs and connecting parts, in line $z$—$z$, Fig. 2. Fig. 8 is a fragmentary rear elevation, on an enlarged scale, of one of the gang planks and one of the disks, the latter being shown in section. Fig. 9 is a top view, on an enlarged scale, of one of the journal thimbles on which one end of the disk gang revolves. Fig. 10 is a side view thereof. Fig. 11 is a vertical section in line $x$—$x$, Fig. 6.

Like letters of reference refer to like parts in the several figures.

A represents the draft pole and A' the cross piece secured to the rear end of the same, both of which constitute, with the usual braces, the rigid harrow frame.

B represents the gang planks and C the disks which are connected in each gang by spools $c$ and a tie rod $c'$.

E E represent inverted U-shaped or bow-shaped supporting frames whereby the disk gangs are connected with the gang planks. Each of these supporting frames E is arranged lengthwise underneath the gang plank and consists of a horizontal portion $e$ and depending arms $e'$ $e^2$ formed at the ends of the horizontal portion. The latter is preferably arranged in a longitudinal groove $f$ formed in the underside of the gang plank and secured therein by means of transverse fastening bolts $f'$. Each of the gangs is journaled near its middle in a bearing G secured to the lower end of the inner arm $e'$ of the supporting frame E by bolts $g$.

H H' represent thimbles upon which the inner ends of the disk gangs are journaled. Each of these thimbles consists of a circular head $h$ provided centrally on one side with a conical boss $h'$ which is arranged in a correspondingly shaped socket $h^2$ formed in the inner end of the adjacent spool. The opposite side of the head $h$ is provided with a square recess $h^3$ extending into said boss and a vertical channel $h^4$ extending from said recess to the edge of the head. Each arm $e^2$ of the supporting frames is provided at its lower end with a horizontal lug $h^5$ of square form. The vertical portion of the arm $e^2$ is arranged in the channel $h^4$ and its lug $h^5$ is seated in the square recess $h^3$, thereby holding the thimble against turning.

When the concave sides of the disks face outwardly, as represented in Figs. 1, 2 and 7, the thimbles at the inner ends of the gangs bear against each other and take up the inward thrust of the disks. One of the thimbles is provided with a downwardly curved eye $i$ on its lower side and the other thimble is provided with a correspondingly shaped hook $i'$ which engages in said eye, thereby forming a simple swiveling connection between the two thimbles, which prevents the gangs from getting out of alignment, but permits each gang to rotate independently of the other.

J J represent draft arms whereby the disk gangs are connected with the rigid frame.

Each of these arms is arranged horizontally underneath the disk gang and is pivoted with its rear end to the rear portion of the central bearing G by a vertical bolt $j$.

K represents brackets to which the front ends of the draft arms are attached. These brackets are secured to the underside of the cross piece A' of the frame near opposite ends thereof by means of vertical bolts $k'$ and are provided with rearwardly extending arbors L which incline downwardly and rearwardly. The front ends of the draft arms are provided on their inner sides with sleeves M which are journaled on the arbors of the brackets and are held on the latter by spring pins $m$. The rocking of the draft arms on the arbors permits the gangs to adjust themselves transversely to the inequalities of the ground. The inclined axis of the arbor is in line or nearly so with the lowest point on the periphery of the disks and this arrangement causes the pressure of the ground to be brought against the lower portions of the disks directly in line with the axis of the arbor, thereby avoiding any lateral leverage at the lower edge of the disks and allowing the gangs a free rocking movement which enables them to conform to the ground and insures a uniform depth of cut at both ends of each gang.

N represents depending ears formed on the outer front corners of the draft arms. $n$ represents bolts arranged in these ears and passing through segmental slots $n'$ formed in depending lugs $n^2$ formed on the brackets K. During the vertical rocking movement of the disk gangs the bolts $n$ are free to move in the segmental slots $n'$. When it is desired to form a rigid harrow the bolts $n$ are tightened which prevents the swivel arms and the disks connected therewith from rocking and holds them rigidly in place.

O represents horizontal adjusting arms whereby the disk gangs are rocked horizontally on the bolts $j$ for the purpose of changing the angle of the disk gangs. These arms are secured with their rear ends to the bearings G and are preferably formed integral with the frames E supporting the gang planks, whereby a very rigid and strong construction is produced. The front end of each adjusting arm is arranged to move horizontally between two guide ribs $p\ p'$ formed on the upper side of the draft arm. These ribs hold the front end of the adjusting arm against vertical movement and increase the rigidity of the connection between the disk gang and the draft arm.

Q represents the hand lever whereby the angle of the disk gangs is adjusted. This lever is pivoted to swing transversely on a bracket $q$ secured upon the cross piece of the main frame on one side of the pole and is provided with a catch which engages with a notched segment $q'$ for holding the lever in its adjusted position.

$r\ r'$ represent connecting rods attached with their inner ends respectively above and below the fulcrum of the hand lever and with their outer ends to the front ends of the adjusting arms O.

S represents movable scraper bars which are supported lengthwise underneath the rear sides of the gang planks by loops $s$ and which are provided with depending scrapers $s'$.

T represents hand levers whereby the scrapers are moved toward and from the disks. These levers T are pivoted to brackets $t$ on the rear sides of the gang planks and engage with their lower ends in loops $t'$ secured to the rear sides of the scraper bars.

Each of the hand levers is provided with a tension device whereby the scrapers are yieldingly held in engagement with or out of engagement with the disks. Each of these tension devices is provided with an upright guide rod $u'$ which is pivoted with its lower end to lugs $u^2$ on the gang plank, vertically in line with the fulcrum of the hand lever. The upper end of the guide rod passes loosely through an opening formed in a post $u^3$ pivoted on the front side of the hand lever.

$u^4$ represents a spring surrounding the guide rod and bearing with its ends against the post $u^3$ and a shoulder $u^5$ formed on the guide rod.

In the position of the parts represented in Fig. 8, the scraper is yieldingly held in contact with the disk by the constant pressure of the spring $u^4$ against the hand lever. Upon moving the hand lever in the direction of the arrow, Fig. 8, the spring is compressed until the hand lever stands vertical, and upon continuing the movement of the hand lever and passing the dead center, the spring assists the forward movement of the hand lever until the latter has reached the limit of its forward movement and then holds the same yieldingly in this position. This tension device is very convenient and simple in construction and avoids the necessity of holding the scrapers against the disks by hand. If it is desired to reverse the disk gangs, their inner ends and the brackets, gangs and connecting parts are transposed, as represented in Fig. 3.

The pivot L of each gang is arranged on one side of the fastening bolt $k'$ and at such a distance therefrom that when the brackets are secured to the cross piece A' in the position represented in Fig. 2, in which the pivots L are on the inner sides of the fastening bolts, the gangs, being arranged with the concave sides of the disks outward, will come in contact or nearly so with their inner ends, while when the brackets and gangs are transposed, so that the pivots are on the outer sides of the brackets, as represented in Fig. 3, the inner ends of the gangs will be sufficiently separated to make room for the earth which is thrown inwardly. This arrangement of the parts permits the gangs to be reversed or transposed without the employment of extra parts, the same bolts and bolt-holes being used for securing the brackets in either position, as well as the same rods for connecting the gangs with the shifting lever by which the angle is adjusted. When an odd number of disks are contained in each gang, as represented in the drawings, the fastening bolt is arranged in line with the draft frame and the pivot is arranged on one side of the fastening bolt and nearly in line with the middle of the gang. When an even number of disks are employed, the pivot is also arranged in line with the middle of the gang and the fastening bolt on one side of the pivot, but in this case, the pivot may be arranged underneath the draft arm, instead of on one side thereof, because the draft arm may extend to the middle of the gang.

I claim as my invention:—

1. The combination with the harrow frame and the disk gang, of a connecting pivot having its axial line arranged tangentially, or practically so, with reference to the lower portions of the disks, substantially as set forth.

2. The combination with the harrow frame and the disk gang, of a connecting arbor having its pivotal axis inclined rearwardly from the frame toward the lower portions of the disks, substantially as set forth.

3. The combination with the harrow frame provided with a rearwardly inclining arbor, of a disk gang, a draft arm pivoted at its rear end to said gang, and a sleeve formed at the front end of said arm and journaled on said arbor, substantially as set forth.

4. The combination with the harrow frame provided with an arbor, of a disk gang, a draft arm pivoted at its rear end to said gang, a sleeve formed at the front end of said arm and journaled on said arbor, and a fastening device whereby the draft arm may be held against movement on said arbor, substantially as set forth.

5. The combination with the harrow frame, of a bracket secured to said frame and provided with a slot, a rearwardly projecting arbor secured to said bracket, a disk gang, a draft arm pivoted at its rear end to said gang and provided at its front end with a sleeve journaled on said arbor, and a fastening bolt arranged in said arm and passing through said slot in the bracket, substantially as set forth.

6. The combination with the harrow frame provided with a rearwardly projecting arbor, of a disk gang, a draft arm pivoted at its rear end to said gang and journaled with its front end upon said arbor, and an adjusting arm secured with its rear end to the gang and guided with its front end upon said draft arm, substantially as set forth.

7. The combination with the harrow frame provided with rearwardly projecting arbors, of disk gangs, draft arms pivoted at their rear ends to said gangs and journaled with their front ends on said arbors, guide ribs formed at the front end of said arbors, adjusting arms secured with their rear ends to said gangs and engaging with their front ends between said guide ribs, a hand lever pivoted on the harrow frame, and rods connecting the front ends of the adjusting arms with said hand lever, substantially as set forth.

8. The combination with the harrow frame provided on each side with a bolt hole and a bolt, and the disk gangs, of brackets secured to the frame by said bolts and provided each with a pivot arranged on one side of said bolt, and draft arms attached to the gangs and hung on the pivots of said brackets, whereby the brackets and gangs can be transposed from one side of the frame to the other without the use of extra parts, substantially as set forth.

9. The combination with the gang plank and a disk gang provided with a socket in its convex end, of a thimble consisting of a head provided with a boss on one side which is seated in said socket, a central recess on its opposite side and a channel extending from said recess to the edge of the head, a depending arm secured to said gang plank and arranged in said channel and a lug formed at the lower end of said arm and seated in said recess, substantially as set forth.

10. The combination with the gang frames, of thimbles secured to the gang frames at the convex ends of the gangs, and provided one with a hook and the other with an eye whereby the two thimbles are coupled together, and disk gangs turning on said thimbles, thereby permitting each gang to rotate independently of the other, but preventing the same from getting out of alignment, substantially as set forth.

11. The combination with the gang plank and the disk gang, of a gang supporting frame consisting of a horizontal portion, which is secured to the gang plank, and depending arms formed at the ends of the horizontal portion and provided at their lower ends with bearings in which the disk gang turns, substantially as set forth.

12. The combination with a gang plank provided with a longitudinal groove in its underside and a disk gang provided with journals at one end and near its middle, of a supporting frame consisting of a horizontal portion secured in said groove and depending arms formed on opposite ends of said horizontal portion and supporting said journals, substantially as set forth.

13. The combination with the harrow frame and the disk gang connected with said frame by a swiveling joint, of a disk supporting frame consisting of a horizontal portion provided at opposite ends with depending arms on which the gang is journaled, and a horizontal adjusting arm extending forwardly from the disk gang and formed integral with one of said depending arms, substantially as set forth.

14. The combination with the gang plank and the harrow disk, of a scraper capable of moving toward and from the disk, a hand lever pivoted to the gang plank and operating the scraper, and a rocking tension device attached to the hand lever and connected with the gang plank at a point located between the extreme positions of the hand lever, whereby the tension device opposes the movement of the hand lever out of either position, and the scraper is held either in or out of engagement, substantially as set forth.

15. The combination with the disk gang, the scrapers capable of moving toward and from the disks, of a hand lever pivoted to the gang plank and connected with said scrapers, a guide rod connecting the gang plank with the hand lever and a spring applied to said guide rod and holding the scrapers either in or out of engagement, substantially as set forth.

Witness my hand this 20th day of October, 1891.

GEORGE G. CROWLEY.

Witnesses:
LEWIS D. COLLINS,
ALBERT J. GLASS.